US008589780B2

(12) United States Patent
Chen et al.

(10) Patent No.: US 8,589,780 B2
(45) Date of Patent: Nov. 19, 2013

(54) PROCESSING GEOGRAPHICAL LOCATION DATA IN A DOCUMENT

(75) Inventors: Jian Chen, Beijing (CN); Ben Fei, Beijing (CN); Rui Ma, Beijing (CN); Zhong Su, Beijing (CN); Xian Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 13/277,405

(22) Filed: Oct. 20, 2011

(65) Prior Publication Data

US 2012/0271624 A1    Oct. 25, 2012

(30) Foreign Application Priority Data

Oct. 25, 2010  (CN) .......................... 2010 1 0526403

(51) Int. Cl.
*G06F 17/00* (2006.01)
(52) U.S. Cl.
USPC ........................................................ 715/202
(58) Field of Classification Search
USPC .................. 715/201, 202, 203, 243, 262, 263
See application file for complete search history.

(56) References Cited

U.S. PATENT DOCUMENTS

| | | | |
|---|---|---|---|
| 7,353,114 B1 * | 4/2008 | Rohlf et al. ........................ | 702/5 |
| 8,239,130 B1 * | 8/2012 | Upstill et al. ................. | 701/426 |
| 2006/0277465 A1 * | 12/2006 | Pandit et al. .................. | 715/531 |
| 2007/0061074 A1 | 3/2007 | Safoutin | |
| 2007/0174770 A1 * | 7/2007 | Safoutin ....................... | 715/700 |
| 2008/0010273 A1 | 1/2008 | Frank | |
| 2008/0261624 A1 * | 10/2008 | Moton et al. ................ | 455/456.2 |
| 2009/0012953 A1 * | 1/2009 | Chu et al. ............................ | 707/5 |
| 2009/0100018 A1 * | 4/2009 | Roberts ............................... | 707/3 |
| 2009/0177644 A1 | 7/2009 | Martinez et al. | |
| 2009/0193007 A1 * | 7/2009 | Mastalli et al. .................... | 707/5 |
| 2009/0281719 A1 | 11/2009 | Jakobson | |
| 2010/0023259 A1 * | 1/2010 | Krumm et al. ................ | 701/208 |
| 2010/0030740 A1 * | 2/2010 | Higgins et al. ..................... | 707/3 |
| 2010/0185933 A1 * | 7/2010 | Coffman et al. .............. | 715/230 |
| 2010/0205541 A1 * | 8/2010 | Rapaport et al. .............. | 715/753 |
| 2010/0235089 A1 * | 9/2010 | Kato ............................. | 701/201 |
| 2010/0250552 A1 * | 9/2010 | Egnor .......................... | 707/741 |
| 2011/0046881 A1 * | 2/2011 | Karaoguz ..................... | 701/208 |
| 2011/0252064 A1 * | 10/2011 | Murugappan ................ | 707/780 |
| 2011/0276568 A1 * | 11/2011 | Fotev ........................... | 707/728 |

FOREIGN PATENT DOCUMENTS

WO         2009132106 A2    10/2009

OTHER PUBLICATIONS

Tsering W. Shawa, "Building a System to Disseminate Digital Map and Geospatial Data Online," Library Trends, Sep. 2006, pp. 254-263, vol. 55, No. 2.
H. Guo et al., "Address Standardization with Latent Semantic Association," 15th ACM SIGKDD Conference on Knowledge Discovery and Data Mining, http://kdd09.crowdvine.com/talks/4934, Jun.-Jul. 2009, 1 page.

(Continued)

*Primary Examiner* — Laurie Ries
(74) *Attorney, Agent, or Firm* — Gail Zarick; Ryan, Mason & Lewis, LLP

(57) ABSTRACT

Techniques for processing geographical location data in a document comprise: obtaining geographical location data in the document; grading the geographical location data according to a predetermined condition to determine an associated relationship between the geographical location data; marking on an electronic map the associated relationship between the geographical location data; and presenting the marked electronic map.

22 Claims, 11 Drawing Sheets

(56) References Cited

OTHER PUBLICATIONS

H. Guo et al., "Domain Adaptation with Latent Semantic Association for Named Entity Recognition," Human Language Technologies: Annual Conference of the North American Chapter of the Association for Computational Linguistics (ACL), Jun. 2009, pp. 281-289.

Stanford University, "The Stanford Natural Language Processing Group," http://nlp.stanford.edu/software/lex-parser.shtml, 6 pages.

K. Daisuke Kitayama, "A Credibility Analyzing Method of Geographical Objects from Digital Maps," 3rd International Conference on Ubiquitous Information Management and Communications (ICUIMC), Jan. 2009, pp. 536-543, Suwon, Korea.

\* cited by examiner

*FIG. 4A*

How the Greece debt crisis threatens the world

Unlike Vegas, what happens in Greece isn't staying in Greece.
A crisis over Greece's mountainous debt is spilling into other European countries, roiling stock markets in the United States and Asia and stoking concerns of a setback in global economic recovery. Stephen Albee, president of the Tampa Trade & World Affairs Council, said the Mediterranean mess has potential to wreak havoc on the U.S. economy, particularly if a European bailout doesn't take hold and the financial squeeze worsens in countries like Portugal. ...

What's Greece's financial situation?
......
What caused the crisis?
......
How has Greece responded?
......
Is it getting better?
To the contrary, Greece is inching closer to default and debt concerns are worsening in some other countries. Ratings agency Standard & Poor's on Tuesday downgraded Greece's debt to junk status and downgraded Portugal's rating by two notches. On Wednesday, the agency downgraded Spain's debt rating by one step.
Why are stock markets in Asia and the United States impacted by what happens in Greece?
Two words: global economy. Consider Europe is the largest market for Asian exports. Financial markets and global banking networks are intertwined. Plus, stock markets hate uncertainty.

Isn't the European Union bailing out Greece?
Germany, the biggest player among 16 countries making up the euro zone, took the lead on crafting a Greek rescue plan. However, Germany's Parliament has yet to approve the proposed aid package of 45 billion euros, or about $60 billion. Germany this week said it must first see more deficit reduction from Greece before fulfilling its pledge. The International Monetary Fund reportedly is also considering a bigger bailout package for Greece, between 100 billion euros and 120 billion euros over the next three years. Portugal and Spain may seek aid as well.

What should we be watching for next?
Whether or not Greece defaults on its debt depends on a couple of factors: successful negotiations for a bailout and any investor appetite to buy its bonds. Some fear a Greek default could eventually spread to other large, fragile economies, including the United Kingdom and even Japan. Already, investors are bracing for growing debt problems in Portugal and Spain.

What does this mean for tourists?
Americans who plan to travel abroad will benefit from a continued decline in the value of the euro. Europe is less expensive now than anytime in the past year. Tourists, however, could face disruptions from strikes.

Any good coming out of this?
If the situation doesn't explode into a larger crisis, there could be some short-term economic benefits for the United States. American companies may be able to raise more money through selling corporate debt. Oil prices have fallen in tandem with anticipation of a drop in European demand. U.S. treasuries have become a safer investment vehicle. But the rise of the dollar also makes it more expensive for American manufacturers to sell their products overseas.

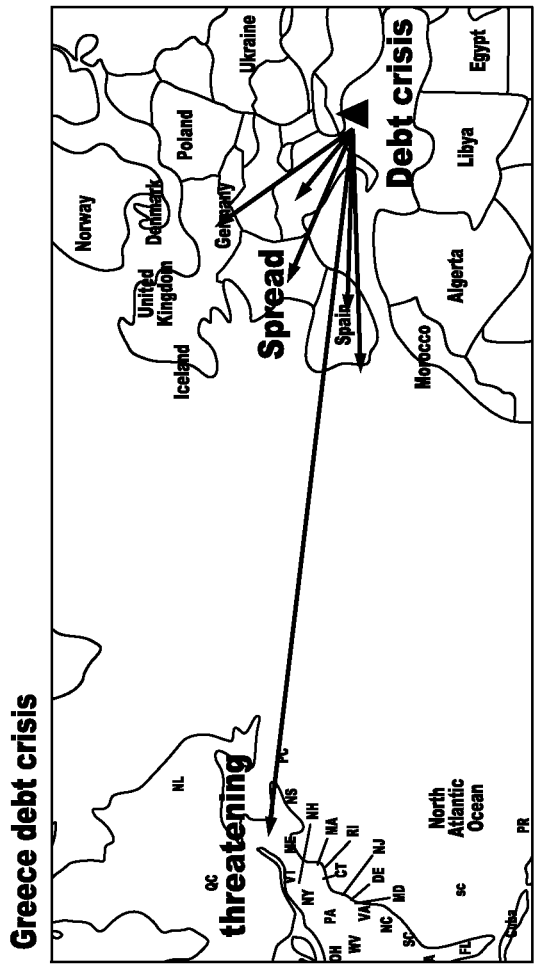

CNN.com
Greece debt crisis now threatens the U.S. economy. According to reports, Greece is at breaking point and the financial contagion is threatening to engulf Europe.

Washingtonpost.com
Is the Greek debt crisis on verge of 'going ... WASHINGTON – The European debt crisis is a stark reminder for the United States to tackle its own massive budget deficit, which some fear will remain at trillion-dollar levels for many years to come.

Foxnews.com:
Greece has led the pack and many others such as Portugal, Spain and ... At the same time seemingly safe institutions in more solid economies like France and Germany hold vast amounts of bonds from their more shaky neighbors like Spain, Portugal and Greece.

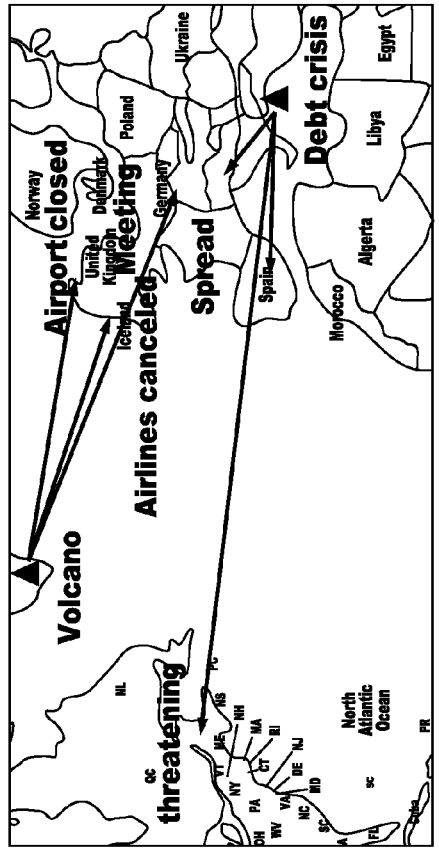

FIG. 6

Greece debt crisis
Greece debt crisis now threatens the U.S. economy. According to reports, Greece is at breaking point and the financial contagion is threatening to engulf Europe. Is the Greek debt crisis on verge of 'going ... WASHINGTON – The European debt crisis is a stark reminder for the United States to tackle its own massive budget deficit, which some fear will remain at trillion-dollar levels for many years to come.
Fears intensify that Euro crisis could snowball. And that problem has escalated into a more serious one namely the sovereign debt crisis. Greece has led the pack and many others such as Portugal, Spain and ... At the same time, seemingly safe institutions in more solid economies like France and Germany hold vast amounts of bonds from their more shaky neighbors, like Spain, Portugal and Greece.

Iceland volcano
The eruption of Iceland's Eyjafjallajokull volcano on April 14 grounded 100000 flights in six days, costing airlines $1.7 billion in sales, according to ...Once again the ash cloud caused by the 2010 Iceland volcano is causing travel disruptions in Europe. The volcano has been disrupting flights on and off now ... As the ash cloud lingers over the United Kingdom, it has left passengers from Glasgow, Scotland to Manchester, England stuck with no available flights. At a meeting in Brussels, ministers endorsed ideas to try to minimize the impact of future disasters, including the creation of a crisis co-ordination group ,..
Airports in Ireland, Britain and the Netherlands reopened on Monday following the dissipation of a cloud of volcanic ash that had caused...

PROCESSING GEOGRAPHICAL LOCATION DATA IN A DOCUMENT

PRIORITY CLAIM

The present application claims priority to the Chinese patent application identified as 201010526403.1, filed on Oct. 25, 2010, and entitled "A Method and Apparatus of Geo-Centric Event Plotting on Digital Map," the disclosure of which is incorporated by reference herein in its entirety.

FIELD OF THE INVENTION

The present invention generally relates to a method and a system for processing data, and more particularly, the present invention relates to a method and a system for processing geographical location data in a document.

BACKGROUND OF THE INVENTION

Geographical location data have been widely applied in various application fields. A plurality of application products about the geographical location data have been developed to provide services to users. A fundamental technology behind these services is electronic map technology. An electronic map is a map stored and reviewed in a digital manner. A method for an electronic map to store information typically uses vector-type image storage, where the map size may be scaled up, scaled down, or rotated, without affecting the display effect. Bitmap storage was previously used, where the map size could not be scaled up or down.

Modern electronic map software typically uses a geographical information system to store and transfer map data. Other information systems may be used. In an electronic map, every place in the world may be searched and browsed. Electronic map services comprise: map browsing, address search, geographical location surrounding search, drive route search, bus route search, satellite picture browsing, scenic picture browsing, and positioning and navigation, etc. Some websites even provide dedicated electronic map services for sightseeing, hotels, and house renting information. An electronic map has currently become an important application technology that is indispensable in daily life.

SUMMARY OF THE INVENTION

Embodiments of the invention provide techniques for processing geographical location data in a document.

For example, in one embodiment of the invention, a method for processing geographical location data in a document comprises: obtaining geographical location data in the document; grading the geographical location data according to a predetermined condition to determine an associated relationship between the geographical location data; marking on an electronic map the associated relationship between the geographical location data; and presenting the marked electronic map.

In another embodiment of the invention, a system for processing geographical location data in a document comprises: geographical location data obtaining means for obtaining geographical location data in the document; associated relationship determining means for grading the geographical location data according to a predetermined condition to determine an associated relationship between the geographical location data; marking means for marking on an electronic map the associated relationship between the geographical location data; and presenting means for presenting the marked electronic map.

In a further embodiment of the invention, an apparatus that performs the above steps comprises a processor and memory configuration.

In yet another embodiment of the invention, an article of manufacture comprises a computer readable storage medium having tangibly embodied thereon computer readable program code which, when executed, causes a computer to perform the above steps.

These and other objects, features and advantages of the present invention will become apparent from the following detailed description of illustrative embodiments thereof, which is to be read in connection with the accompanying drawings.

BRIEF DESCRIPTION OF THE DRAWINGS

The accompanying drawings as referenced in the description are only for illustrating typical embodiments of the present invention, which should not be regarded as limitation to the scope of the present invention.

FIG. 4A illustrates a diagram of a document in an embodiment of the present invention.

FIG. 5 illustrates an electronic map presented after the geographical location data in multiple documents under the same theme are processed according to an embodiment of the present invention.

FIG. 6 illustrates an electronic map presented after the geographical location data in multiple documents under the same theme are processed according to another embodiment of the present invention.

DETAILED DESCRIPTION

Hereinafter, many specific details are provided to help gain a thorough understanding of this invention. However, it is apparent to the skilled in the art that even without these specific details, the understanding of this invention will not be affected. Further, it should be understood that use of any of the following specific terms is only for the convenience of depiction, and thus the present invention should not be limited to any particular application expressed and/or implied by these terms.

The inventors of the present invention have noticed some features in existing electronic map services. First, the existing electronic map services are always dedicated map services, which are not combined with information focused on by a user during web browsing, and for example, when a user is browsing news, the place where the news event occurs cannot be directly displayed in the electronic map for the user to browse. Second, the existing electronic map services cannot automatically present the two associated addresses.

Embodiments of the present invention provide a technology for processing geographical location data in a document to combine geographical location data in the document with an electronic map technology, which therefore creates a brand-new information browsing manner. By using one or more embodiments of the present invention, a user may conveniently, intuitively, and automatically see on an electronic map the geographical location data in the document being browsed and the relationship between the geographical location data.

Figure 1:
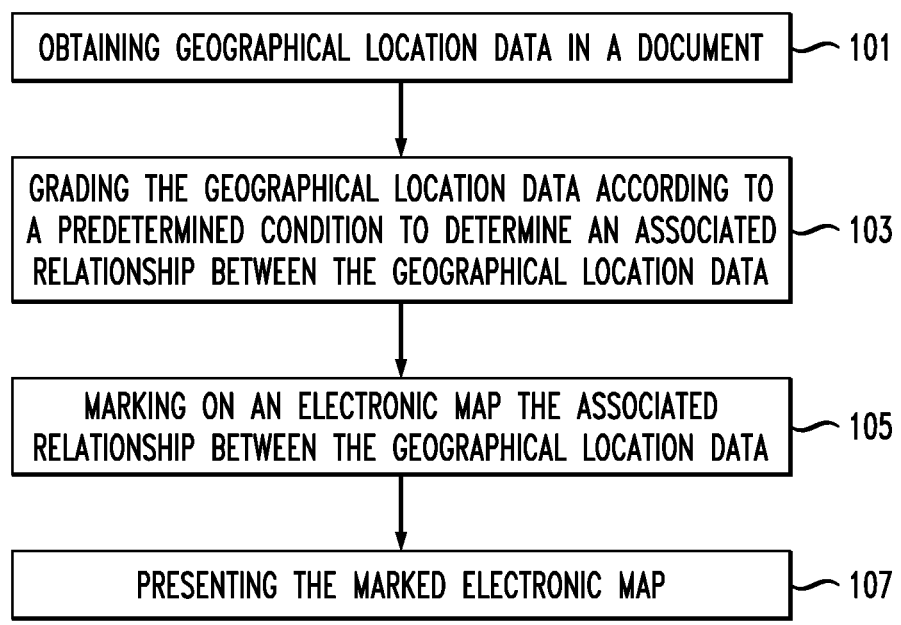
FIG. 1 illustrates a flow chart of a method for processing geographical location data in a document according to an embodiment of the present invention.

FIG. 1 illustrates a flow chart of a method for processing geographical location data in a document according to an embodiment of the present invention. First, at step 101, geographical location data in the document are obtained. The document may come from a Blog, news, etc., stored on a server or from any document as locally stored. The geographical location data may be geographical data of any range, including as big as a continent or as small as a building on a street. The objective of this step is to extract all geographical location data comprised in a document. This step may employ an existing Named Entity Recognition (NER) technology. The Named Entity Recognition technology may recognize person names, address names, organization names, etc., in one or more inputted articles. At step 101, geographical location data including continent, state, area, city, even street, doorplate, etc., may be output from the one or more inputted articles. For a noun with multiple meanings, for example, "Washington," the NER technology may determine whether the "Washington" as cited here is a person name or an address name based on the context. As to the Named Entity Recognition technology, it may refer to Address Standardization with Latent Semantic Association, by Honglei Guo, Huijia Zhu, Zhili Guo, XiaoXun Zhang, and Zhong Su, published on KDD2009 (http://kdd09.crowdvine.com/talks/4934), and Domain Adaptation with Latent Semantic Association for Named Entity Recognition, by Honglei Guo, Huijia Zhu, Zhili Guo, Xiaoxun Zhang, Xian Wu, and Zhong Su, published on NAACL2009 (http://portal.acm.org/citation.cfm?id=1620754.1620795).

At step 103, the geographical location data are graded according to a predetermined condition to determine the associated relationship between the geographical location data. Grading the geographical location data may help further present the mutual relationship between the geographical location data. The predetermined condition further comprises one or more of the following: grading according to importance of the geographical location data (for example, dividing the geographical location data into focus geographical location and non-focus geographical location); grading according to a cause-effect relation between events represented by the geographical location data (for example, dividing the geographical location data into an event cause geographical location and an event effect geographical location); or grading according to a time sequence between events represented by the geographical location data (for example, dividing the geographical location data into a prior geographical location and a posterior geographical location). Of course, the grading is not limited to the two-layer grading structure as listed above, and it may be a multi-layered cascaded grading structure. Moreover, the grading is not merely limited to the above enumerated three grading manners, and it may further comprise other required grading manners. In other words, the grading manner may be further scaled as required by the user. Moreover, the above grading manners may be used separately or in combination.

Figure 3A:
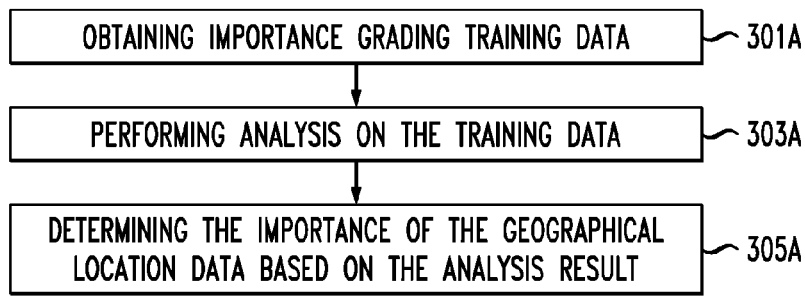
FIG. 3A illustrates a flow chart of grading based on importance of the geographical location data according to an embodiment of the present invention.

If the predetermined condition is to grade according to importance of the geographical location data, then grading the geographical location data according to the predetermined condition to determine the associated relationship between the geographical location data at step 103 may be further refined into steps in FIG. 3A. With reference to FIG. 3A, first, importance grading training data are obtained in step 301A. The importance grading training data may be a plurality of documents. According to an embodiment of the present invention, a user may mark the plurality of documents manually so as to determine focus geographical locations and non-focus geographical locations. Then at step 303A, analysis is performed on the manually marked out training data according to one or more of the following: locations where the geographical location data appear in a document and times that the geographical location data appear in the document, thereby automatically obtaining features of geographical location data which become focus geographical locations. Normally, geographical location data appearing in a document caption always represent a focus geographical location. In most cases, geographical location data appearing in a first sentence of each paragraph of a document also represent focus geographical locations. Of course, those geographical location data appearing frequently always represent focus geographical locations. It may be understood that the above appearing locations and appearing times may be either used separately to determine the features of the geographical location data which become focus geographical locations or used in combination to determine the features of the geographical location data which become focus geographical locations. At step 305A, the importance of the geographical location data is determined based on the analysis result. For example, based on the geographical location data feature of the focus geographical location, it may be determined that whether certain geographical location data in a newly inputted document is a focus geographical location.

Further, different importance grading training data may be selected based on the nature of a document, thereby obtaining geographical location data features of different focus geographical locations. For example, for a news document, geographical location data appearing in a caption have a possibility of above 99% to become a focus geographical location in the document. However, for articles such as a blog, or an essay, the possibility for the geographical location data appearing in the caption to become a focus geographical location is only 80%, and thus it is further necessary to comprehensively consider the appearing times of the geographical location data, so as to comprehensively decide the importance of the geographical location data.

Besides, in the cases where a feature for deciding importance of geographical location data (for example, a geographical location data feature having become a focus geographical location) may be determined manually or by the method of FIG. 3A, it is unnecessary to obtain training data and perform analysis each time a document is obtained, but importance of geographical location data in a document may be decided by directly using a known feature for deciding the importance of the geographical location data (for example, a geographical location data feature having become a focus geographical location), wherein the feature comprises one or more of the following: locations where the geographical location data appear in a document and times that the geographical location data appear in the document.

Figure 3B:
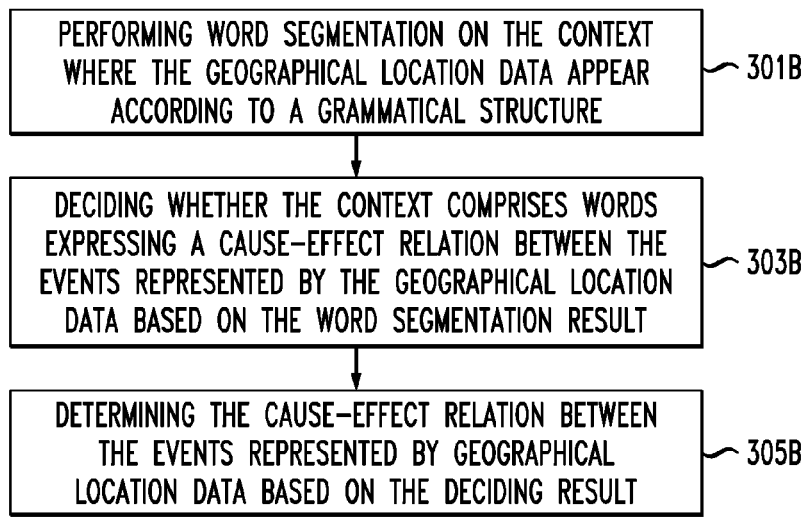
FIG. 3B illustrates a flow chart of grading according to a cause-effect relation of events represented by the geographical location data according to an embodiment of the present invention.

Referring back to FIG. 1, if the predetermined condition is to grade according to a cause-effect relation between the events represented by the geographical location data, then grading the geographical location data according to the predetermined condition to determine the associated relationship between the geographical location data at step 103 may be further refined into steps in FIG. 3B, wherein: at step 301B, word segmentation is performed on the context where the geographical location data appear according to a grammatical structure, wherein the context may be a segment of speech, a sentence, a plurality of phrases, or a phrase, etc., which contains the geographical location data. Embodiments of the invention have no limitations on the method and manner of word segmentation. An example of an existing word segmentation method, for example, is a solution of performing word segmentation on the context provided in the website: http://nlp.stanford.edu/software/lex-parser.shtml (The Stanford Parser: A statistical parser). At step 303B, based on the word segmentation result, it may be decided whether the context comprises words expressing a cause-effect relation between the events represented by the geographical location data. For example, in the context of "Grecian debt crisis is spilling into other European countries and roiling the economic markets in the USA and Asia," the verbs "spilling" and "roiling" may be decided as words expressing a cause-effect relation. In an embodiment, words expressing a cause-effect relation may be limited as a series of specific words or their synonyms, for example, "causing," "resulting," etc. In this embodiment, two geographical locations having a cause-effect relation may be exactly found. However, this embodiment has a disadvantage that it is hard to enumerate all words expressing a cause-effect relation. Thus, at step 303B, some words which have not been defined in advance but likewise express a cause-effect relation may be omitted. In another embodiment, all verbs may be regarded as words expressing a cause-effect relation. In this way, the omission phenomenon as above mentioned may be avoided, but noise may be introduced in some decisions. In practical application, different deciding policies may be selected according to different application requirements. At step 305B, the cause-effect relation between the events represented by the geographical location data is determined based on the decision result, for example, determining that a cause-effect relation exists between the Greece and other European countries in the above example.

Figure 3C:
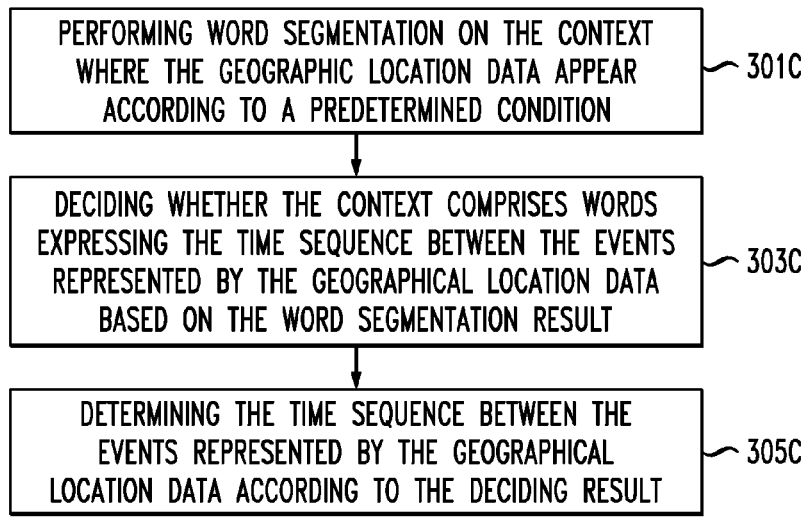
FIG. 3C illustrates a flow chart of grading according to a time sequence between events represented by the geographical location data according to an embodiment of the present invention.

Referring back to FIG. 1, if the predetermined condition is to grade according to a time sequence between the events represented by the geographical location data, then grading the geographical location data according to the predetermined condition to determine the associated relationship between the geographical location data at step 103 may be further refined into steps of FIG. 3C, wherein: at step 301C, word segmentation is performed on the context where the geographical location data appear according to a grammatical structure. At step 303C, based on the word segmentation result, it may be decided whether the context comprises words expressing the time sequence between the events represented by the geographical location data. For example, for the context "today, Mayor Li paid a visit to Haidian District, and tomorrow, Mr. Li will inspect Chaoyang District," the words "today" and "tomorrow" indicating a time sequence associate the two geographical location data "Haidian District" and "Chaoyang District." At step 305C, the time sequence between the events represented by the geographical location data are determined according to the decision result.

Referring back to FIG. 1, grading the geographical location data according to a predetermined condition to determine the associated relationship between the geographical location data at step 103 may further comprise: filtering out geographical location data that does not require marking out according to a context where the geographical location data appears. For example, in a press release, information such as "reported by a correspondent from the Beijing Television Station" frequently appears. Generally, the geographical location "Beijing" in "Beijing Television Station" has no direct associated relationship with the news event as reported, and thus those geographical location data which need not be concerned about may be filtered out based on particular words (for example, "television station," etc.) in a context where the geographical location data appear.

Continuing the steps in FIG. 1, at step 105, the associated relationship between the geographical location data is marked on an electronic map. At step 107, the marked electronic map is presented. According to an embodiment of the present invention, there is no limitation on the manner of marking out the associated relationship, and any marking manner may be used. According to another embodiment of the present invention, a connection line may be used to connect at least two geographical location data having an associated relationship (see FIGS. 4B, 5, and 6). The connection line may be a straight line, dotted line, parabola, etc., and it may be expressed with or without an arrow. According to a still further embodiment of the present invention, a contour line may also be used to mark out at least two geographical location data with an associated relationship (see FIG. 4C). According to a yet further embodiment of the present invention, a verb connecting geographical location data (for example, the verb "roiling" as mentioned above) in the document may be used to mark out the associated relationship between the geographical location data. Besides, at least two geographical location data having an associated relationship may also be highlighted. For example, as to the above example "today, Mayor Li paid a visit to Haidian District, and tomorrow, Mr. Li will inspect Chaoyang District," "Haidian District" and "Chaoyang District" may be highlighted on an electronic map to indicate the associated relationship therebetween, which need not use an explicit connection line or contour line. The present invention has no special imitation on how to highlight at least two geographical locations having an associated relationship. Of course, other manner may also be used to mark out the associated relationship of the geographical location data.

Figure 2:
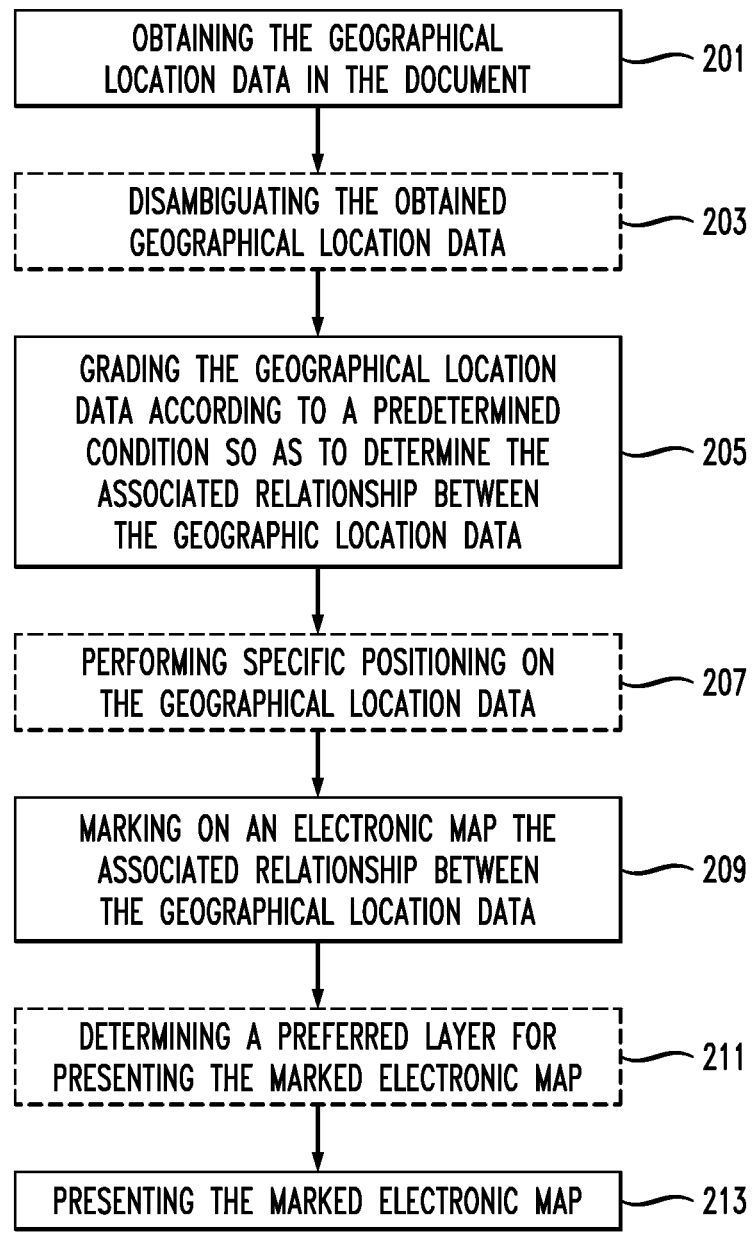
FIG. 2 illustrates a flow chart of a method for processing geographical location data in a document according to another embodiment of the present invention.

FIG. 2 illustrates a flow chart of a method for processing geographical location data in a document according to another embodiment of the present invention. Compared with the method flow of FIG. 1, the method flow of FIG. 2 has three additional steps (203, 207, 211 denoted by dotted blocks) such that the processing effect of the geographical location data becomes more perfect.

First, at step 201, the geographical location data of a document are obtained. Since this step corresponds to step 101 in FIG. 1, its specific implementation manner will not be detailed here.

At step 203, the obtained geographical location data are disambiguated. The disambiguation may be one or more of the following: (1) correcting a wrong expression of the geographical location data obtained from the document, for example, correcting misspelling or miswriting of the geographical location data; (2) expressing the geographical location data in a uniform manner. For example, in a document, there may be a plurality of expressions for "USA," such as "United States," "American," "USA," etc. However, when mapped on an electronic map, those expressions should be expressed in a uniform manner, for example, various expression of "USA" being unified as "United States."

At step 205, the geographical location data are graded according to a predetermined condition so as to determine the associated relationship between the geographical location data. This step corresponds to the step 103 in FIG. 1, and thus its specific content will not be detailed here.

At step 207, specific positioning is performed on the geographical location data, thereby a fine granularity expression of the geographical location data is used to represent the geographical location data. During the process of marking out the associated relationship between the geographical location data in a connection line manner, if one of the geographical location data is a relatively larger geographical scope (for example, "China"), there may be difficult in marking. Thus, a fine granularity expression of the geographical location data may be considered to represent the geographical location data (for example, using the geographical location "Beijing" to express the geographical location data "China"). Likewise, whether to perform positioning at step 207 may also be determined according to the nature of the document data. For example, for a political news document, the method of using a fine granularity expression of the geographical location data to represent the geographical location data per se as recited at step 207 may be used, while for an entertainment news document, step 207 might not be performed. Likewise, there are also a plurality of implementation solutions for the performing sequence of step 207, which may be performed after step 205 or before step 205.

At step 209, the associated relationship between the geographical location data is marked on an electronic map. The content in step 209 corresponds to the content in step 105 in FIG. 1, which will not be detailed here.

At step 211, a preferred layer for presenting the marked electronic map is determined. A person of normal skill in the art understands that the geographical location data in the electronic map is multiple layered according to the granularity of the geographical data, for example, 5 layers, 10 layers, and 20 layers, etc. With a 5-layered data as an example, in layer 1, the electronic map can only present each continent and country, while in layer 2, the electronic map may present cities of each country, and in layer 3, the electronic map may present main streets of each city, and so forth. By constant Zoom In and Zoom Out actions, the user may look up an electronic map in different layers. In order to present the marked electronic map more perfectly at step 213, at step 211, a preferred layer for presenting the marked electronic map is determined. There is a plurality of manners for determining a preferred layer, for example, determining the layer where the focus geographical location data appear as the preferred display layer, or determining the layer where most geographical location data are located as the preferred display layer, etc. According to an embodiment of the present invention, after the preferred layer for presenting is determined, the user can still look up the marked electronic map with different granularities through the Zoom In and Zoom Out actions. For example, when an electronic map is presented with fine granularity, a connection line for presenting an associated relationship between the geographical location data may point to Dorset County (a county of southwest England on the English channel). However, if the user zooms out to an electronic map with a relative coarse granularity, the connection line for presenting the associated relationship between the geographical location data may point to England.

In different embodiments, one or more of steps 203, 207, 211 may be selectively applied, or none of steps 203, 207, 211 may be selected.

FIG. 4A illustrates a diagram of a document in an embodiment of the present invention. This document introduces the impact of Grecian debt crisis on other countries and regions in the world, and the affected countries include the USA, Germany, Spain, Portugal, England, and Japan. The document as shown in FIG. 4A may be a news report on a web or a locally stored article. The present invention may process the geographical location data in the document of FIG. 4A to finally present the marked electronic map.

Figure 4B:
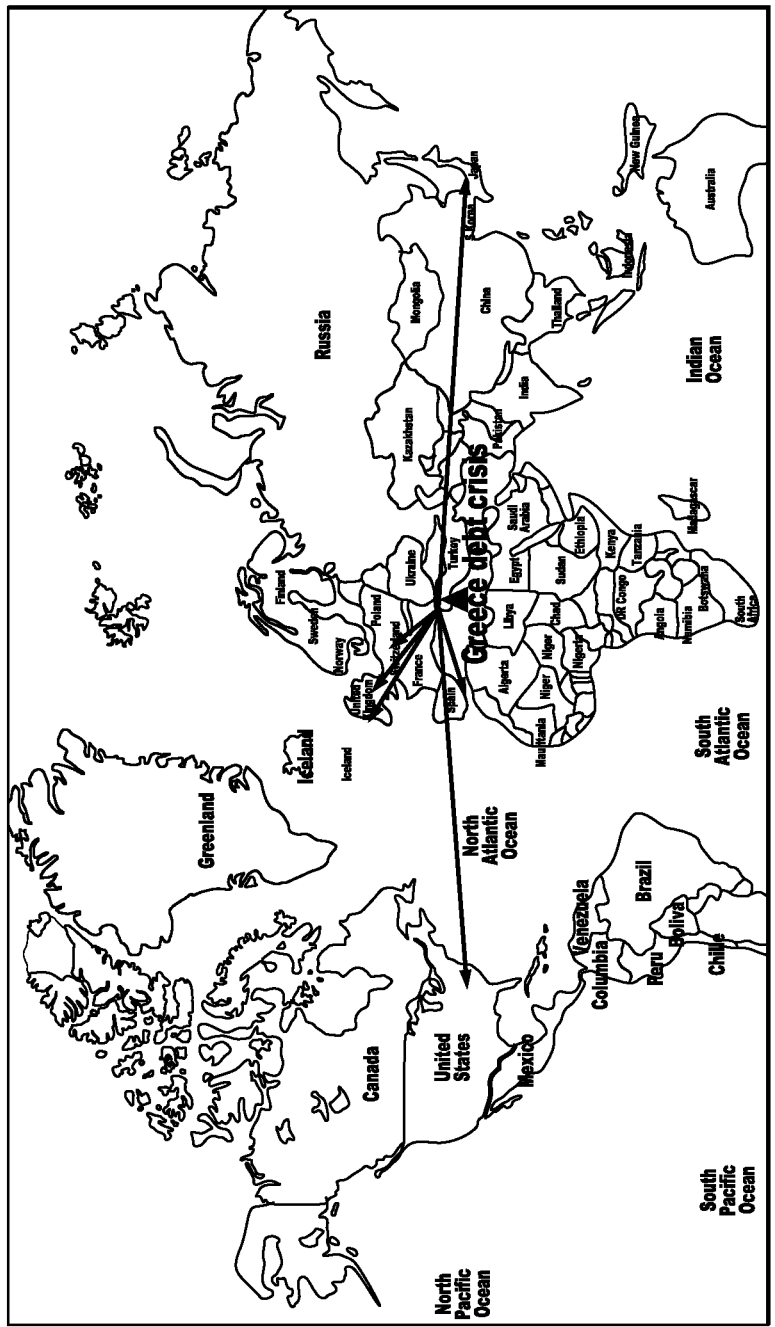
FIG. 4B illustrates an electronic map presented after the geographical location data of FIG. 4A are processed according to an embodiment of the present invention.

FIG. 4B illustrates an electronic map presented after the geographical location data of FIG. 4A is processed according to an embodiment of the present invention. In this figure, the area denoted by a triangle is Greece, and the 6 connection lines with arrows indicate 6 countries affected by the Grecian debt crisis. Hereinafter, an exemplary illustration will be made to the process of obtaining an electronic map in FIG. 4B according to the embodiment as shown in FIG. 2. At step 201, all geographical location data in the document of FIG. 4A are first obtained, comprising Greece, USA, Germany, Spain, Portugal, England, and Japan. At step 203, disambiguation is performed on the obtained geographical location data, comprising unifying "United States," "U.S.," and "American." At step 205, the geographical location data are graded according to a predetermined condition to determine an associated relationship between the geographical location data. In this embodiment, the geographical location data may be graded according to a cause-effect relation between the events represented by the geographical location data so as to determine the associated relationship between the geographical location data, i.e., the associated relationship between Greece and other countries. At step 207, specific positioning is performed on the geographical location data, for example, representing the USA by the American capital "Washington." In order to display the connection line with arrows clearly in a limited space, the places as pointed to by some arrows in FIG. 4B might not be the capital of the country. At step 209, the geographical location data and their associated relationship are marked out on an electronic map, i.e., marked with a collection line with arrow. In other embodiments, a connection line without arrow may also be used to mark. At step 211, a preferred layer for presenting the marked electronic map is determined, for example, selecting the third layer of the 5 layers as the preferred layer. At step 213, the marked electronic map is presented, as shown in FIG. 4B.

Figure 4C:
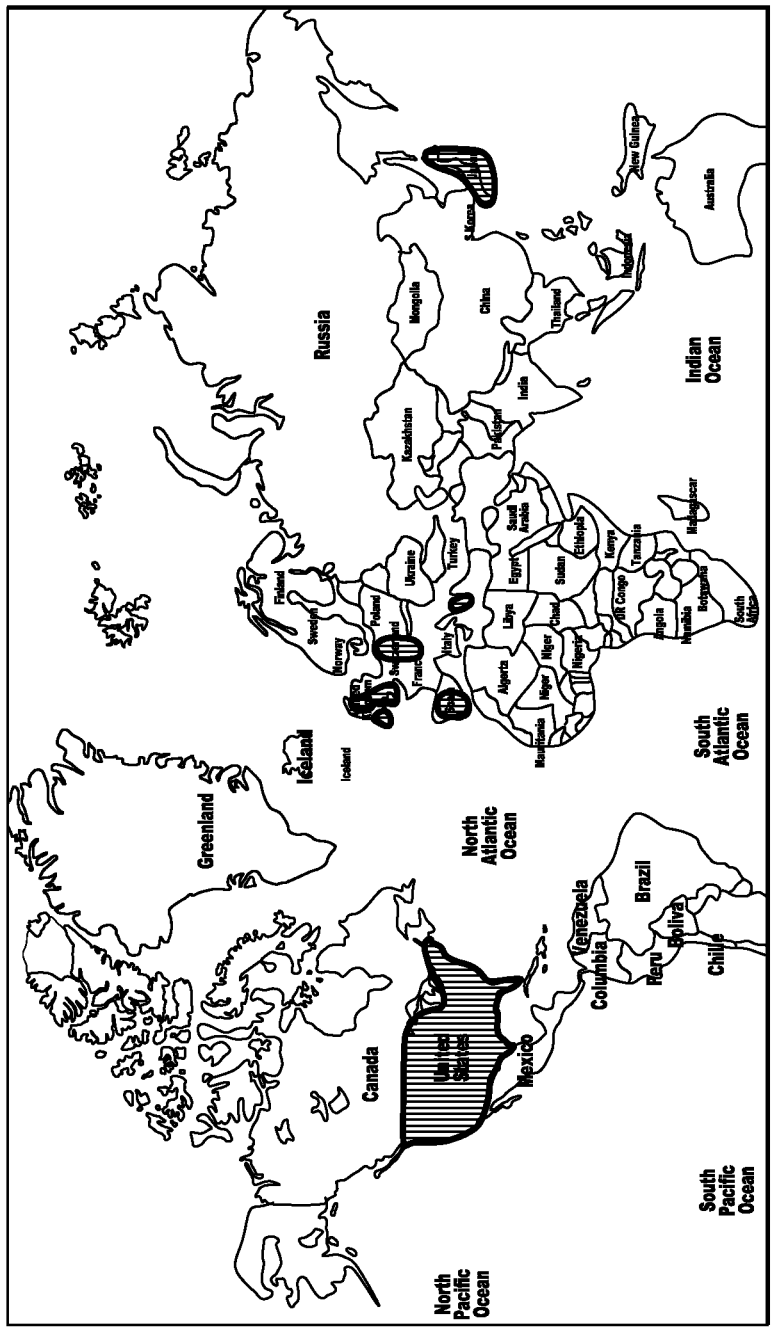
FIG. 4C illustrates an electronic map presented after the geographical location data of FIG. 4A are processed according to another embodiment of the present invention.

FIG. 4C illustrates an electronic map presented after the geographical location data of FIG. 4A are processed according to another embodiment of the present invention. Unlike FIG. 4B, FIG. 4C uses a contour line instead of a connection line to indicate the countries affected by the Grecian debt crisis.

FIG. 5 illustrates an electronic map presented after the geographical location data in multiple documents under the same theme are processed according to an embodiment of the present invention. In the embodiment of FIG. 5, the geographical location data in multiple documents under the same theme (including news from CNN, Washington Post, and Fox News) may be processed and presented in the same electronic map. Besides the connection lines, the embodiment in FIG. 5 may also mark a verb connecting two geographical location data, for example, using the verb "threatening" to additionally mark the connection line connecting Greece and the USA.

FIG. 6 illustrates an electronic map presented after the geographical location data in multiple documents under the same theme are processed according to another embodiment of the present invention. There are two documents in FIG. 6, one being about the Grecian debt crisis, and the other being about the volcano eruption of Iceland. Connection lines in different colors may be used to present an associated relationship between geographical location data of different themes on the same electronic map.

Figure 7:
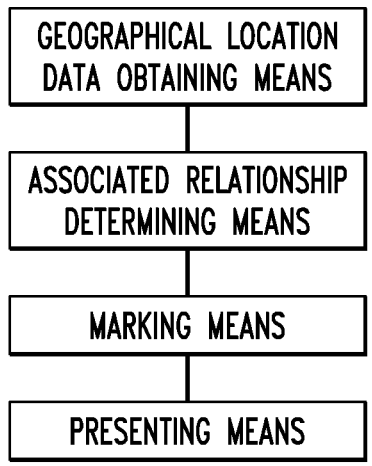
FIG. 7 illustrates a block diagram of a system for processing geographical location data in a document according to an embodiment of the present invention.

FIG. 7 illustrates a block diagram of a system for processing geographical location data in a document according to an embodiment of the present invention. The system in FIG. 7 comprises geographical location data obtaining means for obtaining geographical location data in the document, associated relationship determining means for grading the geographical location data according to a predetermined condition to determine an associated relationship between the geographical location data, marking means for marking on an electronic map the associated relationship between the geographical location data, and presenting means for presenting the marked electronic map.

The predetermined condition as the basis for the associated relationship determining means may comprise one or more of the following: grading according to importance of the geographical location data; grading according to a cause-effect relation between the events represented by the geographical location data; and grading according to a time sequence of the events represented by the geographical location data.

If the predetermined condition is to grade according to importance of the geographical location data, then the associated relationship determining means further comprises: importance feature determining means for determining a feature for deciding the importance of the geographical data; and importance deciding means for deciding the importance of geographical location data in the document based on the feature for deciding the importance of the geographical location data, wherein the feature may comprise one or more of the following items: appearing locations of the geographical location data in the document, and appearing times of the geographical location data in the document.

If the predetermined condition is to grade according to a cause-effect relation between the events represented by the geographical location data, the associated relationship determining means further comprises: grammatical structure analyzing means for performing word segmentation on a context where the geographical location data appear according to a grammatical structure, cause-effect relation deciding means for deciding whether the context comprises words expressing a cause-effect relation between the events represented by the geographical location data based on the word segmentation result, and cause-effect determining means for determining a cause-effect relation between the events represented by the geographical location data according to the deciding result.

If the predetermined condition is to grade according to a time sequence between the events represented by the geographical location data, the associated relationship determining means further comprises: grammatical structure analyzing means for performing word segmentation on a context where the geographical location data appear according to a grammatical structure, time sequence deciding means for deciding whether the context comprises words expressing a time sequence between the events represented by the geographical location data based on the word segmentation result, and time-sequence determining means for determining a time sequence between the events represented by the geographical location data according to the deciding result.

According to an embodiment of the present invention, the associated relationship determining means may further comprise filtering means. The filtering means is for filtering out geographical location data that do not need to be marked out based on a context where the geographical location data appear.

According to an embodiment of the present invention, the marking means is further for marking out an associated relationship between the geographical location data with a connection line.

According to another embodiment of the present invention, the marking means is further for marking out an associated relationship between the geographical location data with a contour line.

Respective means in FIG. 7 correspond to respective steps in FIG. 1, and thus the embodiments described in the introduction to the method in FIG. 1 will not be repeated hereinafter.

Figure 8:
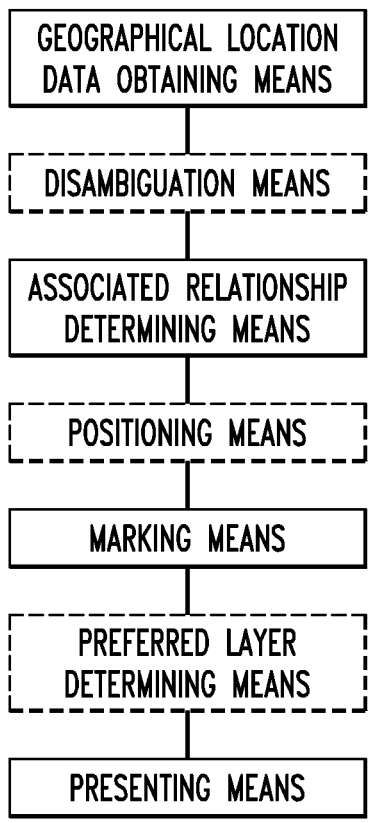
FIG. 8 illustrates a block diagram of a system for processing geographical location data in a document according to another embodiment of the present invention.

FIG. 8 illustrates a block diagram of a system for processing geographical location data in a document according to another embodiment of the present invention. The system in FIG. 8 comprises geographical location data obtaining means, disambiguation means, associated relationship determining means, positioning means, marking means, preferred layer determining means, and presenting means, wherein the geographical location data obtaining means, associated relationship determining means, marking means, and presenting means are identical to those in FIG. 7, and their specific functions and embodiments will not be repeated here. Compared with the system in FIG. 7, the system of FIG. 8 has three extra means, namely disambiguation means, positioning means, and preferred layer determining means. Among them, the disambiguation means is for performing disambiguation on the obtained geographical location data, comprising expressing the geographical location data in a uniform manner; the positioning means is for performing specific positioning on the geographical location data, thereby a fine granularity expression of the geographical location data is used to represent the geographical location data; and the preferred layer determining means is for determining a preferred layer for presenting the marked electronic map such that the presenting means further presents the marked electronic map according to the preferred layer.

Respective means in FIG. 8 correspond to respective steps in FIG. 2, and thus the embodiments described in the introduction to the method in FIG. 2 will not be repeated hereinafter.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1 through 8, the diagrams in the Figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

The terms as used herein are only for illustrating specific embodiments, but not intended to limit this invention. The phrase "a" and "the" in singular form herein is intended also to include a plural form, unless otherwise specified in the context. It should be further noted that when the word "comprising" is used in this specification, it indicates existence of a feature, unity, step, operation, unit and/or component as set forth, but it does not exclude existent or addition of one or more other features, unities, steps, operations, units and/or components, and/or their combination.

Accordingly, techniques of the invention, for example, as depicted in FIGS. 1-8, can also include, as described herein, providing a system, wherein the system includes distinct modules (e.g., modules comprising software, hardware or software and hardware). By way of example only, the modules may include but are not limited to the means blocks respectively shown in FIGS. 7 and 8. These and other modules may be configured, for example, to perform the steps described and illustrated in the context of FIGS. 1-8.

Figure 9:
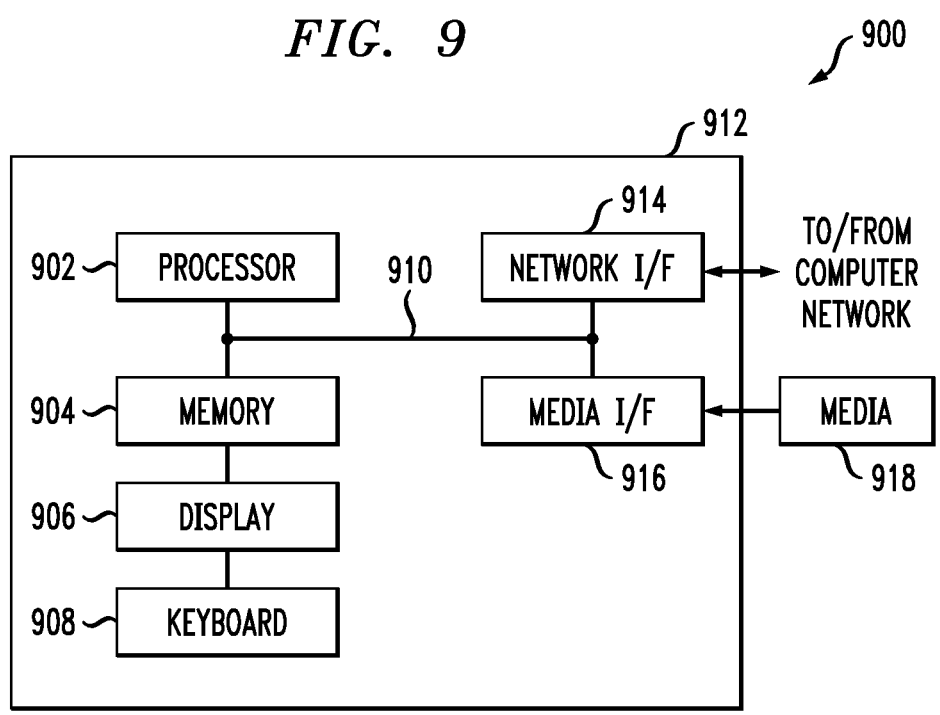
FIG. 9 illustrates a block diagram of a computer system for implementing one or more embodiments of the present invention.

One or more embodiments can make use of software running on a general purpose computer or workstation. With reference to FIG. 9, such an implementation 900 employs, for example, a processor 902, a memory 904, and an input/output interface formed, for example, by a display 906 and a keyboard 908. The term "processor" as used herein is intended to include (but not be limited to) any processing device, such as, for example, one that includes a CPU (central processing unit) and/or other forms of processing circuitry. Further, the term "processor" may refer to more than one individual processor. The term "memory" is intended to include (but not be limited to) memory associated with a processor or CPU, such as, for example, RAM (random access memory), ROM (read only memory), a fixed memory device (for example, hard drive), a removable memory device (for example, diskette), a flash memory and the like. In addition, the phrase "input/ output interface" as used herein, is intended to include (but not be limited to) one or more mechanisms for inputting data to the processing unit (for example, keyboard or mouse), and one or more mechanisms for providing results associated with the processing unit (for example, display or printer).

The processor 902, memory 904, and input/output interface such as display 906 and keyboard 908 can be interconnected, for example, via bus 910 as part of a data processing unit 912. Suitable interconnections, for example, via bus 910, can also be provided to a network interface 914, such as a network card, which can be provided to interface with a computer network, and to a media interface 916, such as a diskette or CD-ROM drive, which can be provided to interface with media 918.

A data processing system suitable for storing and/or executing program code can include at least one processor 902 coupled directly or indirectly to memory elements 904 through a system bus 910. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 908, display 906, pointing device, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard. Also, the computer architecture 900 could represent an illustrative implementation of a client device.

The corresponding structure, material, operation, and all equivalent replacements of functionally limited means or steps in the claims are intended to comprise any structure, material or operation for performing the function in combination with other units as specifically set forth in the claims. The provided description on the present invention is intended for illustration and depiction, which is not for exhaustion, or limiting the present invention to the expressed form. To a person of ordinary skill in the art, many modifications and variations may be apparently made without departing from the scope and spirit of the present invention. Selection and illustration of the embodiments are for better explaining the principle and actual application of the present invention such that a person of normal skill in the art may understand that the present invention may have various embodiments with various kinds of changes suitable for the required specific use.

What is claimed is:

1. A method for processing geographical location data in a document, comprising:
    obtaining geographical location data in the document;
    grading the geographical location data according to a predetermined condition to determine an associated relationship between the geographical location data;
    marking on an electronic map the associated relationship between the geographical location data; and
    presenting the marked electronic map, wherein the document is from a source independent of the electronic map.

2. The method according to claim 1, further comprising:
    disambiguating the obtained geographical location data, including expressing the geographical location data in a uniform manner.

3. The method according to claim 1, wherein the predetermined condition further comprises one or more of the following:
    grading according to importance of the geographical location data;
    grading according to a cause-effect relation between events represented by the geographical location data; and
    grading according to a time sequence between events represented by the geographical location data.

4. The method according to claim 3, wherein if the predetermined condition is to grade according to importance of the geographical location data, then grading the geographical location data according to a predetermined condition to determine an associated relationship between the geographical location data further comprises:
    determining a feature for deciding importance of the geographical location data;
    deciding the importance of the geographical location data in the document according to the feature for deciding importance of the geographical location data, wherein the feature comprises one or more of the following:
    locations where the geographical location data appear in the document, and
    times that the geographical location data appear in the document.

5. The method according to claim 3, wherein if the predetermined condition is to grade according to a cause-effect relation between events represented by the geographical location data, then grading the geographical location data according to a predetermined condition to determine an associated relationship between the geographical location data further comprises:
    performing word segmentation on a context where the geographical location data appear according to a grammatical structure;
    deciding whether the context comprises words expressing a cause-effect relation between the events represented by the geographical location data based on the word segmentation result; and
    determining the cause-effect relation between the events represented by the geographical location data based on the deciding result.

6. The method according to claim 3, wherein if the predetermined condition is to grade according to a time sequence between events represented by the geographical location data, then grading the geographical location data according to a predetermined condition to determine an associated relationship between the geographical location data further comprises:
    performing word segmentation on a context where the geographical location data appear according to a grammatical structure;
    deciding whether the context comprises words expressing a time sequence between the events represented by the geographical location data based on the word segmentation result; and
    determining the time sequence between the events represented by the geographical location data based on the deciding result.

7. The method according to claim 1, wherein the grading the geographical location data according to a predetermined condition to determine an associated relationship between the geographical location data further comprises:
  based on a context where the geographical location data appear, filtering out geographical location data that do not need to be marked.

8. The method according to claim 1, further comprising: performing specific positioning on the geographical location data, thereby using a fine granularity expression of the geographical location data to represent the geographical location data.

9. The method according to claim 1, further comprising:
  determining a preferred level for presenting the marked electronic map, wherein the presenting the marked electronic map further comprises presenting the marked electronic map according to the preferred layer.

10. The method according to claim 1, the marking on the electronic map the geographical location data and their associated relationship further comprises: marking an associated relationship between the geographical location data with one or more of the following:
  a connection line, a contour line, and a verb connecting geographical location data in the document.

11. A system for processing geographical location data in a document, comprising:
  geographical location data obtaining means, configured for obtaining geographical location data in the document;
  associated relationship determining means, configured for grading the geographical location data according to a predetermined condition to determine an associated relationship between the geographical location data;
  marking means, configured for marking on an electronic map the correlation relationship between the geographical location data; and
  presenting means, configured for presenting the marked electronic map, wherein the document is from a source independent of the electronic map.

12. The system according to claim 11, further comprising: disambiguation means, configured for disambiguating the obtained geographical location data, including expressing the geographical location data in a uniform manner.

13. The system according to claim 12, further comprising:
  preferred layer determining means, configured for determining a preferred layer for presenting the marked electronic map, and the presenting means further presents the marked electronic map according to the preferred layer.

14. The system according to claim 11, wherein the predetermined condition further comprises one or more of the following:
  grading according to importance of the geographical location data; grading according to a cause-effect relation between events represented by the geographical location data; and
  grading according to a time sequence between events represented by the geographical location data.

15. The system according to claim 14, wherein if the predetermined condition is to grade according to importance of the geographical location data, then the associated relationship determining means further comprises:
  importance feature determining means, configured for determining a feature for deciding the importance of the geographical location data; and
  importance deciding means, configured for deciding the importance of the geographical location data in the document according to said feature for deciding the importance of the geographical location data, wherein the feature comprises one or more of the following: locations where the geographical location data appear in the document, and times that the geographical location data appear in the document.

16. The system according to claim 14, wherein if the predetermined condition is to grade according to a cause-effect relation between events represented by the geographical location data, then the associated relationship determining means further comprises:
  grammatical structure analyzing means, configured for performing word segmentation on a context where the geographical location data appear according to a grammatical structure;
  cause-effect relation deciding means, configured for deciding whether the context comprises words expressing the cause-effect relation between the events represented by the geographical location data based on the word segmentation result; and
  cause-effect relation determining means, configured for determining the cause-effect relation between the events represented by the geographical location data according to the deciding result.

17. The system according to claim 14, wherein if the predetermined condition is to grade according to a time sequence between events represented by the geographical location data, then the associated relationship determining means further comprises:
  grammatical structure analyzing means, configured for performing word segmentation on a context where the geographical location data appear according to a grammatical structure;
  time-sequence deciding means, configured for deciding whether the context comprises words expressing the time sequence between the events represented by the geographical location data based on the word segmentation result; and
  time sequence determining means, configured for determining a time sequence between the events represented by the geographical location data according to the deciding result.

18. The system according to claim 11, wherein the associated relationship determining means further comprises:
  filtering means, configured for filtering out geographical location data that do not need to be marked based on a context where the geographical location data appear.

19. The system according to claim 11, further comprising:
  positioning means, configured for performing specific positioning on the geographical location data, thereby using a fine granularity expression of the geographical location data to represent the geographical location data.

20. The system according to claim 11, the marking means is further configured for marking an associated relationship between the geographical location data with one or more of the following:
  a connection line, a contour line, and a verb connecting the geographical location data in the document.

21. An apparatus for processing geographical location data in a document, comprising:
  a memory; and
  a processor coupled to the memory and configured to:
    obtain geographical location data in the document; grade the geographical location data according to a predetermined condition to determine an associated relationship between the geographical location data;
    mark on an electronic map the associated relationship between the geographical location data; and
    present the marked electronic map, wherein the document is from a source independent of the electronic map.

22. An article of manufacture for processing geographical location data in a document comprising a computer readable storage medium having tangibly embodied thereon computer readable program code which, when executed, causes a computer to:
   obtain geographical location data in the document;
   grade the geographical location data according to a predetermined condition to determine an associated relationship between the geographical location data;
   mark on an electronic map the associated relationship between the geographical location data; and
   present the marked electronic map, wherein the document is from a source independent of the electronic map.

* * * * *